July 25, 1961 H. F. STERLING ET AL 2,993,762
METHODS OF PRODUCING SILICON OF HIGH PURITY
Filed Oct. 7, 1957
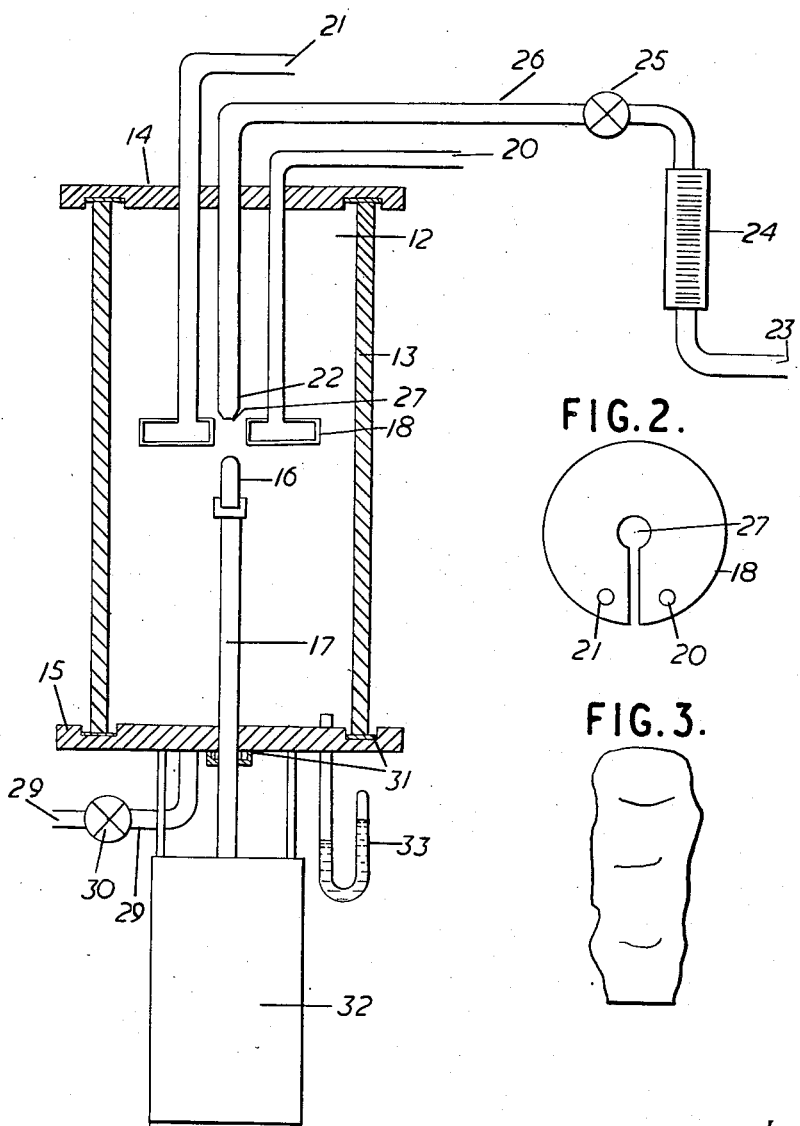
Inventors
H.F. Sterling - E. L. Bush
By John M. Calimafde
Attorney

# United States Patent Office 2,993,762
Patented July 25, 1961

2,993,762
METHODS OF PRODUCING SILICON OF HIGH PURITY
Henley Frank Sterling and Eric Langley Bush, London, England, assignors to International Standard Electric Corporation, New York, N.Y.
Filed Oct. 7, 1957, Ser. No. 688,452
Claims priority, application Great Britain Oct. 16, 1956
5 Claims. (Cl. 23—223.5)

This invention relates to a process for the manufacture of a body or ingot of pure silicon having a rod-like form.

The invention comprises an improvement in, or modification of, the invention described and claimed in British Patent No. 745,698.

In the said specification No. 745,698, which for convenience will be called the parent specification, pure silane is thermally decomposed on a hot silicon seed, whereby an ingot of pure silicon of generally bulbous or mushroom form is produced. Subsequently it is necessary to remelt the silicon ingot in order to obtain by a pulling process a rod of polycrystalline or monocrystalline silicon. Great difficulties are experienced when any attempt is made to remelt silicon in a crucible, because no crucible material has so far been found which does not either stick to the silicon or contaminate it. Therefore in order to produce a pulled rod of silicon, the process described in the specification of co-pending United States application, Serial No. 688,460, filed October 7, 1957, is preferred. In this process the end of the silicon ingot is kept melted, and a rod of silicon is continuously pulled out of it without the use of any crucible.

For this process, however, a silicon ingot of bulbous or mushroom form is inconvenient, and it is therefore the object of the present invention to control the silane decomposition process of the parent specification in such manner that the silicon ingot is produced in a roughly rod-like form.

The invention will be described with reference to the drawing, in which:

FIG. 1 shows a diagram of apparatus, shown partly in section, for drawing silane under reduced pressure into a decomposition zone in which silicon is deposited on the surface of a heated silicon seed;

FIG. 2 shows a plan view of the concentrator shown in FIG. 1; and

FIG. 3 shows a view of a roughly rod-like body or ingot of silicon produced according to the present invention.

FIG. 1 shows an example of apparatus used in a method of growing pure crystalline silicon from gaseous silane, according to the principles of the parent specification. The decomposition chamber 12 constituted by a cylinder 13 with end plates 14 and 15 sealed to the cylinder 13 in vacuum tight manner. A crystalline silicon seed 16 is fixed in a holder supported on a rod 17, and its upper surface is heated by direct coupling to the electromagnetic field of a copper current concentrator 18 which is in the form of a hollow single-turn coil shown in plan view in FIG. 2, which coil is water-cooled by circulating water through it from an input tube 20 to an output tube 21. The concentrator 18 is connected by the metal tubes 20 and 21 to the secondary winding of a radio frequency transformer not shown, the primary coil of which forms a tuned circuit of an induction heater which may oscillate at a frequency of approximately 1 mc./s., for example.

Silane is admitted to the chamber 12 from a storage cylinder through an inlet 23 and passes through a flow meter 24 and a valve 25 to an inlet pipe 26 which terminates in a jet 22 just above an aperture 27 in the concentrator 18. The aperture 27 is arranged in proximity to the face of the silicon seed 16 so that the upper surface of the seed 16 is raised to the desired temperature.

The silane is drawn through the aperture 27 in the concentrator 18 by means of a vacuum pump connected to an outlet pipe 29, with the interposition of a pressure regulating tap 30.

The rod 17 passes through a vacuum seal 31 in the lower plate 15 and is connected to a mechanism 32 which rotates and lowers it at a predetermined rate.

The flow rate as read on the meter 24 and the pressure as read on a manometer 33 are adjusted by the valves 25 and 30 to give the desired form for the silicon ingot grown on the seed 16.

The rate at which the rod 17 is lowered is adjusted to be sufficient to keep the surface of the seed or body 16, growing as it does with the addition of silicon, at the same level.

The appearance of the grown body or ingot is as shown in FIG. 3, and can be seen to be of approximately rod-like form. The actual shape or contour of the silicon ingot shown in FIG. 3 is determined by the following factors:

(1) The temperature of the silicon seed 16;
(2) The pressure in the decomposition chamber 12;
(3) The rate of flow of the silane;
(4) The position of the top of the seed or ingot with respect to the silane inlet at the jet 22, and the aperture 27 of the concentrator 18.

For producing thick or thin rods, the top surface of the growing rod should preferably be maintained level with the under surface of the concentrator 18, and its temperature should be maintained between about 1050° and 1150° C., preferably as near as possible to 1100° C.

Thick rods are produced with lower pressures in the decomposition chamber, and with higher rates of flow of the silane, than thin rods. Both these variables may be adjusted over reasonable ranges, according to the thickness of the rods desired. For example, the pressure in the decomposition chamber may be in the range 8 to 17 mm. Hg, and the rate of flow of the silane may be from 12 to 25 litres per hour. In particular, a rod about 3 cm. in diameter will be obtained with a pressure of 10 mm. Hg, and a rate of flow of 20 litres per hour. A rod about 2.5 cm. in diameter will be obtained with a pressure of 25 mm. Hg and a rate of flow of 15 litres per hour.

Thick rods produced in this way may have slightly concave tops, while thin rods tend to have flat tops. If a convex rounded top is required for thick or thin rods, the rod is grown with the appropriate pressure and rate of flow, but after a given period of growth, the pressure in the decomposition chamber is gradually increased to about 25 mm. Hg, and the rate of flow is at the same time gradually decreased to about 5 litres per hour.

While the principles of the invention have been described above in connection with specific embodiments, and particular modifications thereof, it is to be clearly understood that this description is made only by way of example, and not as a limitation on the scope of the invention.

What we claim is:

1. A process of manufacture of a rod of substantially pure silicon which comprises directing a stream of substantially pure silane into a zone bounded by a horizontal substantially circular concentrator coil and the surface of a silicon seed, which surface is initially substantially level with the lower surface of the coil, the said coil and seed being enclosed in a decomposition chamber, supplying a high-frequency alternating current to the coil of such magnitude as to maintain the temperature of the surface of the seed at substantially 1,000° C., whereby the silane is thermally decomposed and silicon is deposited on the surface of the seed, drawing the said seed downwards in such manner that the growing surface of the rod is maintained substantially level with the lower surface of the coil, adjusting the pressure in the decomposition chamber to not less than 8 mm. Hg for thick rods and not more than 17 mm. Hg for thin rods, and maintaining the flow of the silane at not more than 25 litres per hour for thick rods, and not less than 12 litres per hour for thin rods.

2. A process for manufacture of substantially pure silicon which comprises passing substantially pure silane into a zone bounded by a horizontal substantially circular concentrator coil and the surface of a silicon rod or seed maintained substantially level with the lower surface of the coil, the said coil and the said rod or seed being enclosed in a decomposition chamber, supplying a high-frequency alternating current to the coil of such magnitude as to maintain the temperature of the first-mentioned surface between 1050° C. and 1150° C., whereby the silane is thermally decomposed and silicon is deposited on the said first-mentioned surface, adjusting the pressure in the decomposition chamber to a value lying between 8 mm. Hg and 17 mm. Hg, and maintaining the flow of the silane at a rate lying between 12 and 25 litres per hour.

3. A process of manufacture of substantially pure silicon which comprises passing substantially pure silane into a zone bounded by a horizontal substantially circular concentrator coil and the surface of a silicon rod or seed maintained substantially level with the lower surface of the coil, the said coil and the said rod or seed being enclosed in a decomposition chamber, supplying a high frequency alternating current to the coil of such magnitude as to maintain the temperature of the first-mentioned surface substantially at 1100° C., whereby the silane is thermally decomposed and silicon is deposited on the said first-mentioned surface, adjusting the pressure in the decomposition chamber to a value of substantially 15 mm. Hg, and maintaining the flow of the silane at a rate of substantially 15 litres per hour.

4. A modification of the process according to claim 3 comprising adjusting the pressure in the decomposition chamber to a value of substantially 10 mm. Hg, from 15 mm. Hg, and adjusting the rate of flow of the silane to maintain it substantially at 20 litres per hour.

5. A process according to claim 3 comprising maintaining the conditions stated for a given period, and afterwards gradually increasing the pressure in the decomposition chamber to about 25 mm. Hg, and at the same time gradually decreasing the rate of flow of the silane to about 5 litres per hour.

References Cited in the file of this patent

UNITED STATES PATENTS

| 2,763,581 | Freedman | Sept. 18, 1956 |
| 2,768,074 | Stauffer | Oct. 23, 1956 |

FOREIGN PATENTS

| 745,698 | Great Britain | Feb. 29, 1956 |